U. G. WHITE.
AIRSHIP.
APPLICATION FILED MAY 15, 1912.
1,059,247.
Patented Apr. 15, 1913.
5 SHEETS—SHEET 4.
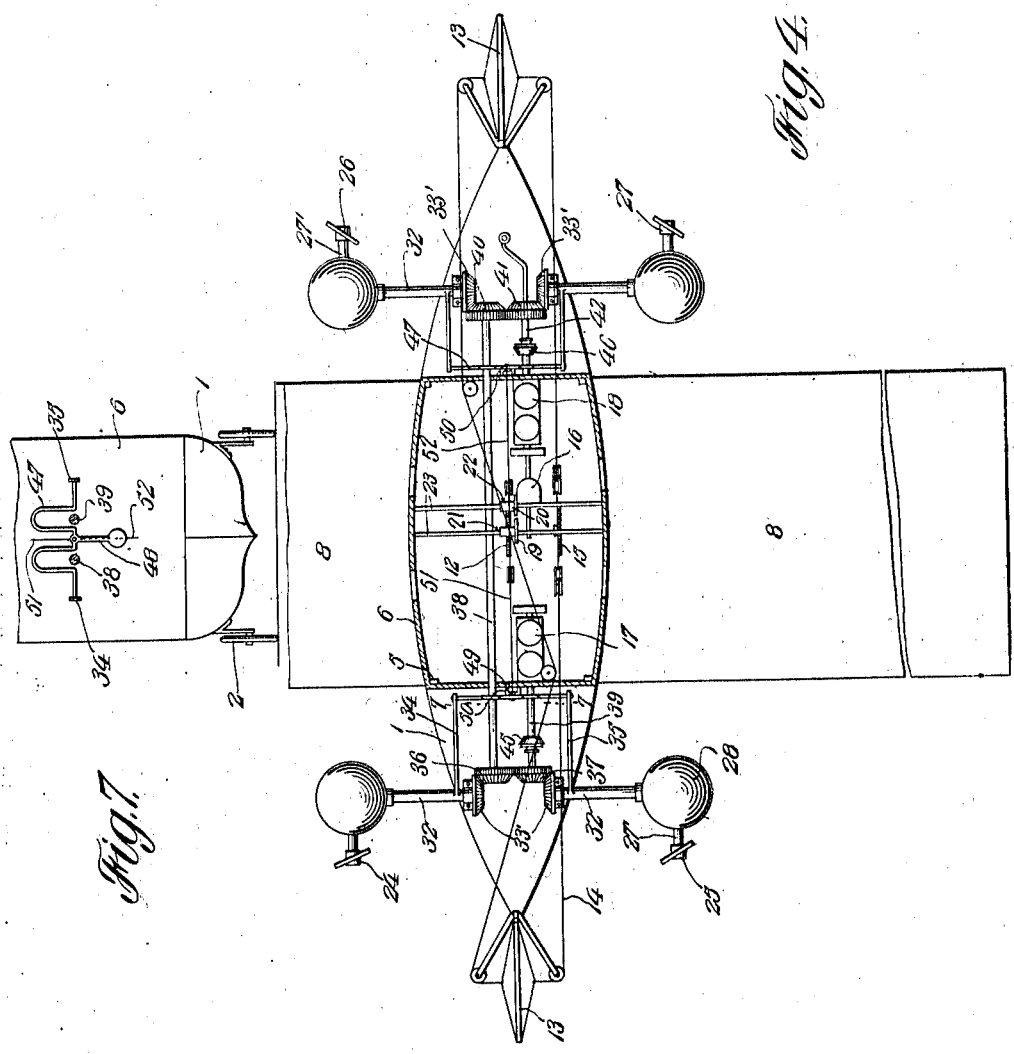

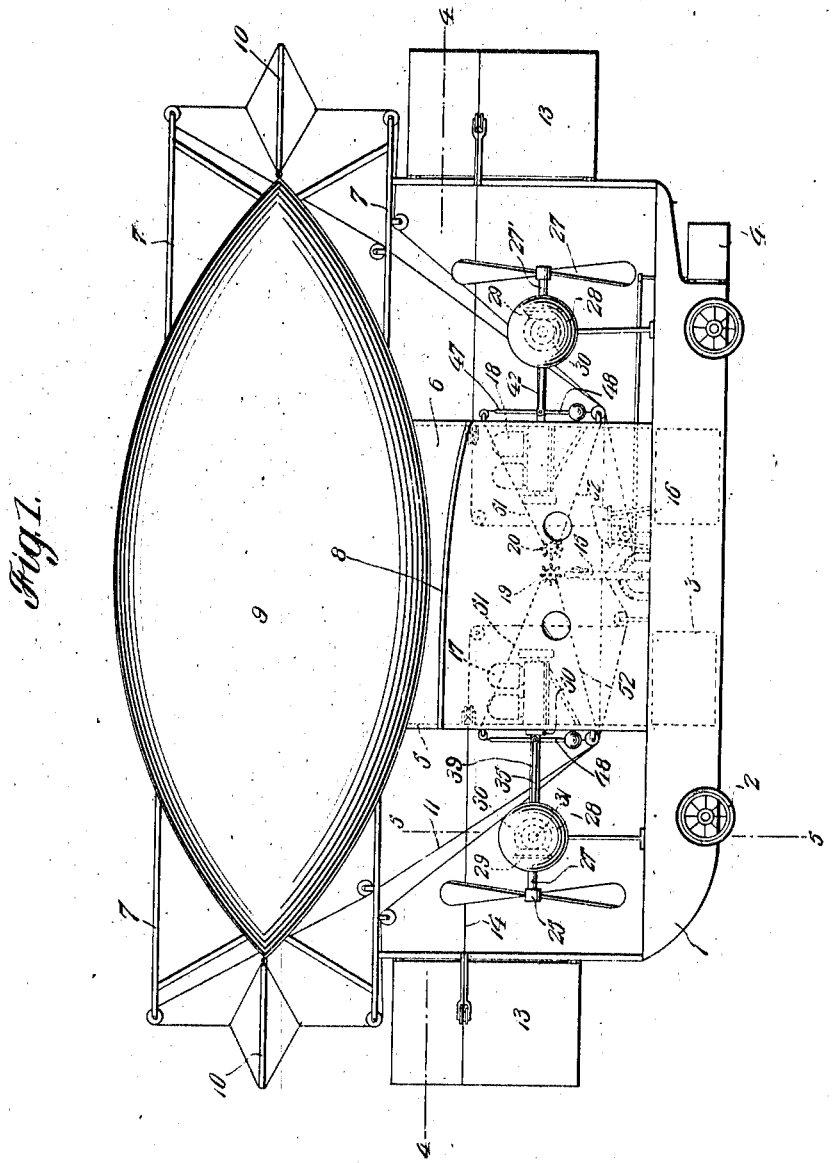

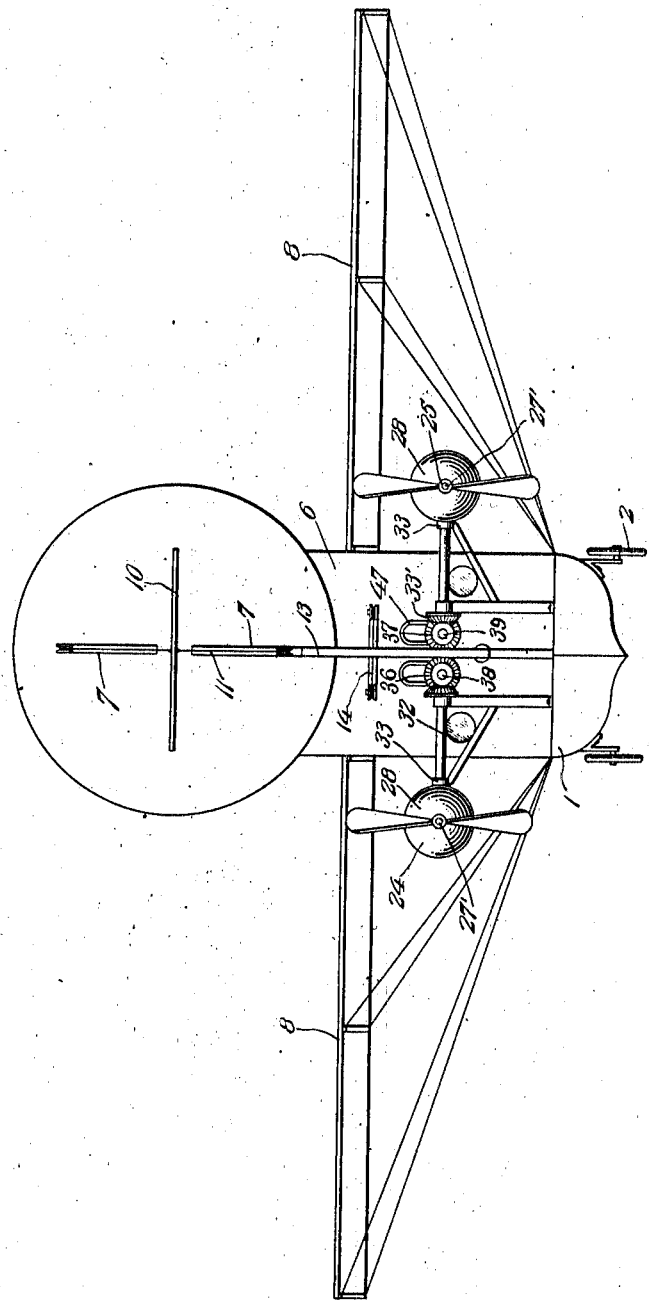

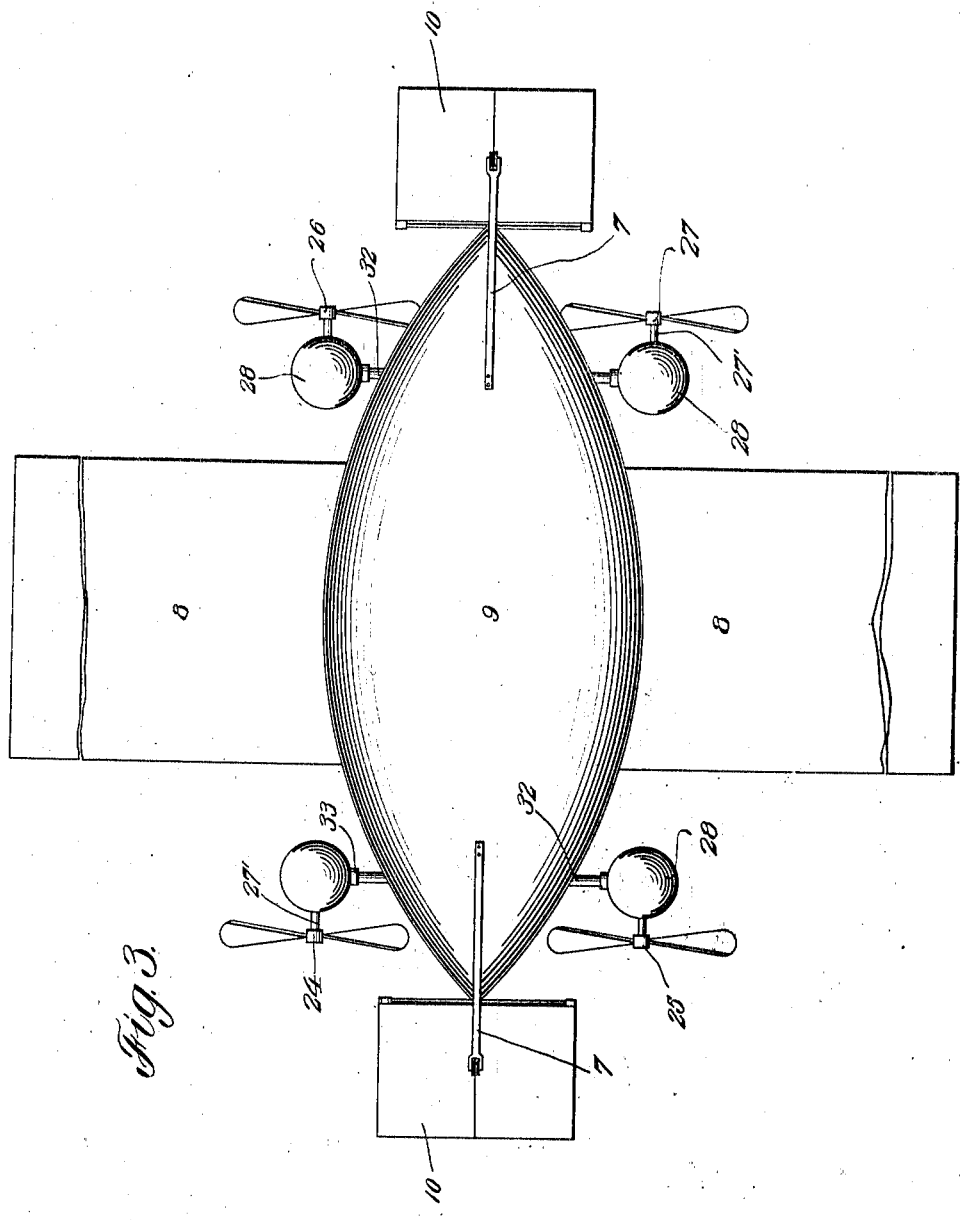

U. G. WHITE.
AIRSHIP.
APPLICATION FILED MAY 15, 1912.
1,059,247.
Patented Apr. 15, 1913.
5 SHEETS—SHEET 5.
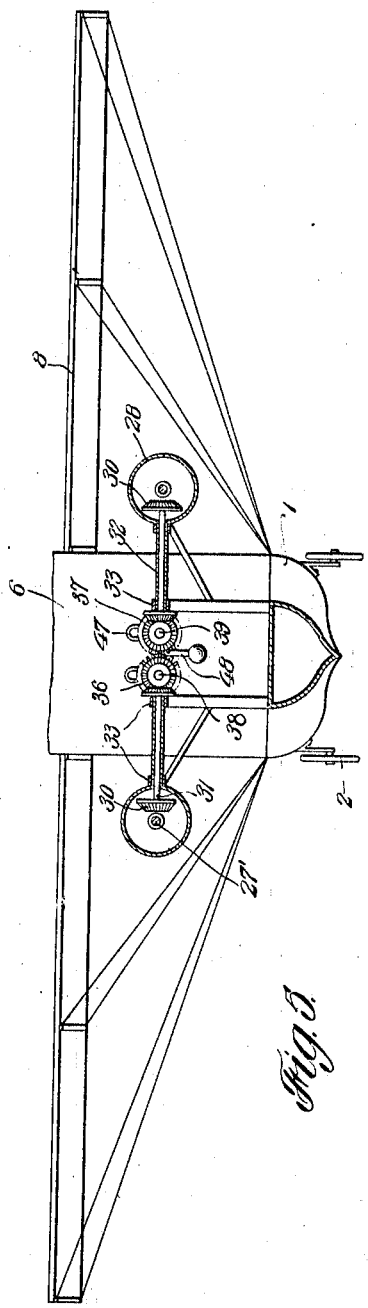
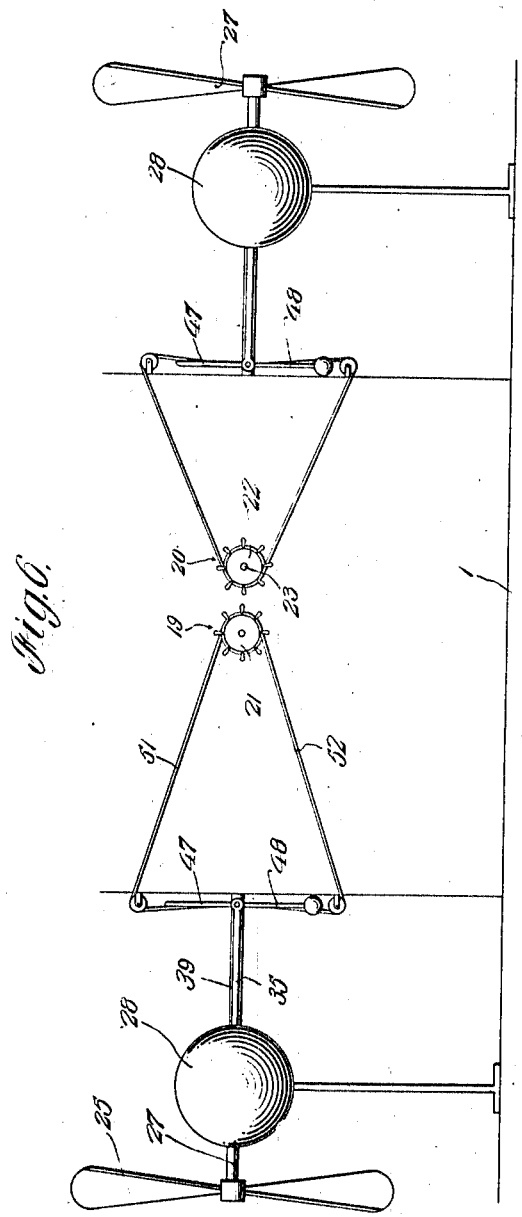
Witnesses
J. H. Crawford.
C. C. Hines
Inventor
U. G. White,
By Victor J. Evans
Attorney

UNITED STATES PATENT OFFICE.

ULYSSES G. WHITE, OF BOULDER, MONTANA.

AIRSHIP.

1,059,247.

Specification of Letters Patent.  Patented Apr. 15, 1913.

Application filed May 15, 1912. Serial No. 697,497.

*To all whom it may concern:*

Be it known that I, ULYSSES G. WHITE, a citizen of the United States, residing at Boulder, in the county of Jefferson and State of Montana, have invented new and useful Improvements in Airships, of which the following is a specification.

This invention relates to airships or flying machines of the heavier-than-air type, and particularly to heavier-than-air flying machines employing an aerostat or balloon having sufficient lifting capacity to support a portion of the weight thereof.

One object of the invention is to provide an airship of this type which may be launched without a lengthy preliminary run, which may be sustained in the air at a desired altitude above any fixed position on the earth beneath it for the purpose of making observations, etc., which may be landed with ease and facility in a substantially vertical path of descent, which is adapted to alight upon, ride along and rise from the surface of a body of water, and which possesses high speed, lifting power and a maximum degree of inherent stability.

A further object of the invention is to provide a construction of machine in which the aviator, motors and controlling devices are inclosed within a housing, and thus protected from the current of air when the machine is in flight, which housing is heated by radiation from the engines, thus enabling a comfortable temperature to be maintained therein when the machine is being operated during cold weather or at a high altitude.

A further object of the invention is to provide a novel construction and arrangement of steering and controlling devices, whereby the machine may be dirigibly operated in any direction vertically or horizontally in an easy and convenient manner.

A still further object of the invention is to provide a novel construction and arrangement of driving, lifting and stabilizing propellers, which may be operated from either one or both of a pair of motors, and which are adjustable to positions to facilitate the ascension of the ship or control its descent, as well as to maintain longitudinal and lateral stability.

A further object of the invention is to provide simple and effective automatic means for adjusting the propellers and manually operable means for regulating the action of the adjusting means when occasion requires.

The invention consists of the features of construction, combination and arrangement of parts, hereinafter fully described and claimed, reference being had to the accompanying drawings, in which:—

Figure 1 is a side elevation of an airship embodying my invention. Fig. 2 is a front elevation of the same. Fig. 3 is a top plan view of the airship. Fig. 4 is a horizontal section on the line 4—4 of Fig. 1. Fig. 5 is a vertical transverse section on the line 5—5 of Fig. 1. Fig. 6 is a diagrammatic view of the means for controlling and adjusting the propellers for lifting and balancing actions. Fig. 7 is a vertical transverse section on the line 7—7 of Fig. 6.

Referring to the drawings, 1 designates the main frame of the structure, which comprises a boat-shaped body or nacelle, which carries suitable launching and landing wheels 2, and which is adapted to sustain the ship upon the surface of a body of water and permit it to alight and travel thereon and rise therefrom. This body is adapted to contain one or more fuel supply tanks or reservoirs 3, and is provided with a suitable rudder 4 for steering the machine when traveling upon the surface of a body of water. Rising from said boat-shaped body or nacelle is a central frame structure including suitable uprights 5 and a car or housing 6, which latter may be of any suitable shape to diminish its resistance to travel through the air. This frame structure supports front and rear head frame sections 7 and a supporting plane 8 which latter may be of any suitable length and width. The parts of the frame are properly tied and braced to secure a strong and durable structure.

Supported by the head frame sections 7 is a cigar-shaped balloon or aerostat 9, adapted to contain hydrogen or other gas lighter than air, and having sufficient lifting capacity to support the greater part of the weight of the machine. This aerostat, in addition to serving as a supporting element, also provides a surface which is arranged sufficiently above the load weight to provide a low center of gravity, whereby, in connection with the resistance of the aerostat to displacement, a maximum amount of inherent stability is secured.

Mounted upon the frame portions 7 are front and rear horizontal rudders 10 which are connected by cables 11 and passing over suitable guides with a control device 12 arranged within the car, said cables being so disposed as to adjust the rudders simultaneously in the same direction, either upward or downward when the controlling device is moved in either direction, to guide the ship either upwardly or downwardly or to enable its longitudinal balance to be maintained. At the front and rear of the central frame structure are arranged vertical rudders 13 which are connected by cables 14 passing over suitable guides with nother control device 15 arranged within the car, said cables being also arranged to effect the adjustment of said rudders in the same directions in unison when the controlling device is moved in one direction or the other, to steer the machine to the right or left in its course of travel. By the arrangement of these sets of rudders at the front and rear of the craft, efficiency of steering control is obtained.

The controlling devices 12 and 15 are preferably in the form of levers mounted to swing in a fore and aft direction and provided with pawls or other locking devices to engage racks, whereby they may be secured in adjusted position. These controlling devices are arranged within the housing 5 in proximity to the aviator's seat 16, and also arranged within said housing are front and rear motors 17 and 18 and controlling devices 19 and 20, said controlling devices 19 and 20 comprising hand wheels connected with drums 21 and 22, respectively, mounted upon shafts 23, all of said controlling devices, as well as the feed connections to the engines, being arranged within the housing so as to be conveniently accessible to the aviator without requiring him to leave his seat. The housing is provided with suitable port holes or windows through which the aviator may have free outlook in all directions. The housing is heated by radiation from the motors, whereby a comfortable temperature may be maintained therein when the machine is flying at a high altitude or in cold weather.

At the front and rear of the central frame are arranged pairs of propellers 24, 25, 26 and 27, the propellers of each pair being arranged on opposite sides of the longitudinal center of the machine and driven in opposite directions. Each propeller is mounted upon a longitudinal shaft 27' journaled in a gear casing 28 and carrying a beveled gear 29 meshing with a beveled gear 30 on the outer end of a transverse transmission shaft 31. The shaft 31 is journaled in a sleeve 32 fixed to and forming a part of the casing 28 and journaled in one or more bearings 33 on the frame. The respective sleeves 32 of the right and left hand propeller casings are provided with crank arms 34 and 35, whereby said casings may be adjusted on the shafts 31 as axes to vary the positions of the propellers, as hereinafter described.

Gears 33' on the front transmission shafts respectively mesh with gears 36 and 37 on the forward ends of longitudinal shafts 38 and 39, while the corresponding gears of the rear transmission shafts respectively mesh with gears 40 and 41 on the shaft 38 and a shaft 42. The shafts 39 and 42 are adapted to be connected with and disconnected from the shafts of the respective motors 17 and 18 by clutch devices 45 and 46 so that either one or both motors may be thrown into and out of operation at will, or either motor employed for driving both sets of propellers without the necessity of stopping the other motor. It will be observed in this connection that the shaft 38 is common to both sets of propeller gearing, adapting the same to be simultaneously operated from either motor. The clutches 45 and 46 are connected with suitable shipper levers or controlling devices arranged within the housing whereby they may be adjusted as required.

The crank arms 34 and 35 of each set of controlling gearing are coupled by a link bar 47 fixed to a depending weighted pendulum lever 48 pivotally supported to swing laterally upon a carrier bar or block 49 adjustable vertically in a fixed guideway 50. By this construction when the ship tilts laterally in either direction a relative motion between the weighted pendulum lever and the crank arms 34 and 35 will be set up, to adjust one of said crank arms to throw the associated propeller upwardly and to adjust the other crank arm to throw the associated propeller downward, whereby a depressing action on the part of one propeller is secured at the uptilted side and a lifting action secured on the part of the other propeller secured at the depressed side, resulting in a lateral balance of the machine being restored by the action of the propellers while the machine is still being driven ahead. The adjustable carrier bars or blocks 49 of the respective front and rear weighted pendulum levers are supported in normal position by cables 51 and 52 leading over suitable guide pulleys to the drums 21 and 22 of the controlling devices 19 and 20, said cables being so arranged that by reverse motions of the drums the carrier bars may be raised or lowered to tilt the gear casing of each set of propellers simultaneously in the same direction, either upwardly or downwardly, whereby both propellers of a set may be tilted downward to different degrees for a lifting action or tilted upward to different degrees for a depressing action. By this method of adjusting the propellers both sets of propellers may be adjusted to positions in which they exert a lifting effect solely, so that their thrust pressure may be employed in connection with the aerostat to maintain the machine supported at a suitable elevation above any given point on the earth's surface for the purpose of making observations, etc. The propellers may also be adjusted to simultaneously exert a depressing action to facilitate the operation of landing, when it is desired to make a rapid descent. The propellers may further be adjusted in different directions to lift the machine at the front and depress it at the rear, or vice versa, so that the ship may be longitudinally balanced or steered in a vertical plane, whereby a maximum efficiency of control is obtained and greater safety insured. By proper adjustment the propellers may be operated to secure a quick ascent with a minimum ground run, so that the ship may be launched within a comparatively small area.

From the foregoing description, taken in connection with the drawings, the construction and mode of operation will be readily understood, and it will be seen that an airship is provided which enables the advantages sought to be obtained to be secured in a satisfactory manner.

While the construction disclosed is preferred, it will of course be understood that the invention is not restricted thereto, as many of the features thereof may be employed upon various types of air craft without departing from the spirit of the invention as defined in the appended claims.

Having thus described the invention, what I claim as new is:—

1. A flying machine embodying alined transverse shafts, sleeves journaled on said shafts and provided at their outer ends with casings, propeller shafts journaled in said casings and in gear with the outer ends of the transverse shafts, motor driven means in gear with the inner ends of the transverse shafts for imparting motion thereto, crank arms upon the sleeves, a vertically adjustable support, a link pivotally connecting the crank arms and pivotally mounted upon said support, a pendulum lever connected with said link, and means for raising and lowering said support.

2. In a flying machine, the combination of a pair of alined transverse shafts, sleeves journaled on said shafts and having casings at their outer ends, propeller shafts journaled in said casings and in gear with the outer ends of the transverse shafts, gears upon the inner ends of the transverse shafts, motor driven gearing in mesh with the inner ends of the transverse shafts, a vertically adjustable support, a lever fulcrumed thereto, crank arms upon the sleeves, a link carried by the lever and pivotally connecting the crank arms thereto, and means for raising and lowering said support.

3. In a flying machine, a pair of alined transverse shafts sleeves journaled on said shafts, and provided at their outer ends with casings, propeller shafts journaled in said casings and in gear with the outer ends of the transverse shafts, gears engaging the inner ends of the transverse shafts for transmitting motion thereto, crank arms carried by the sleeves, a vertically adjustable support, a lever pivotally connected with said support and pivotally coupled to the crank arms, whereby the sleeves may be turned simultaneously in opposite directions, and means for raising and lowering said support to simultaneously raise or lower the crank arms and turn the sleeves accordingly.

4 In a flying machine, a pair of alined transverse shafts, sleeves journaled on said shafts and provided at their outer ends with casings, propeller shafts journaled in said casings and in gear with the outer ends of the transverse shafts, crank arms carried by the sleeves, drive gearing connected with the inner ends of the transverse shafts, a vertically adjustable support, a lever pivotally connected with said support, a transverse member pivotally coupling said lever to the crank arms, whereby through the swinging movements of the lever the crank arms and sleeves may simultaneously turn in opposite directions, a control drum, and connections between said control drum and support whereby the latter may be raised or lowered to simultaneously move the crank arms and sleeves in the same direction, either upwardly or downwardly.

5. A flying machine including right and left hand propellers, longitudinal shafts carrying said propellers, transverse shafts in gear with the longitudinal shafts, casings in which said longitudinal shafts are journaled, said casings being journaled on the transverse shafts, crank arms connected with said casings, a vertically movable support, a laterally swinging weighted member carried by said support, a lever operated by said weighted member and connected with said crank arms, and means for vertically adjusting said support.

6. In a flying machine, the combination of front and rear pairs of alined shafts, propellers driven by the shafts, gears upon the inner ends of the respective shafts, a pair of separate and independent motors, transmission shafts driven thereby and provided with gears meshing respectively with the gears of one of the transverse shafts of each pair, means for independently throwing said transmission shafts into and out of connection with the motors, and a second transmission shaft continuous between the pairs of transverse shafts and carrying gears meshing with the first named transmission shafts and with the gears of the other transverse shafts.

In testimony whereof I affix my signature in presence of two witnesses.

ULYSSES G. WHITE.

Witnesses:
 DAN. M. HALFORD,
 JOHN T. MURPHY.